United States Patent [19]

Priest

[11] Patent Number: 5,737,277

[45] Date of Patent: Apr. 7, 1998

[54] METHOD FOR COMPUTING BOREHOLE GEOMETRY FROM ULTRASONIC PULSE ECHO DATA

[75] Inventor: John F. Priest, Tomball, Tex.

[73] Assignee: Western Atlas International, Inc., Houston, Tex.

[21] Appl. No.: 735,982

[22] Filed: Oct. 25, 1996

Related U.S. Application Data

[63] Continuation-in-part of Ser. No. 690,776, Aug. 1, 1996, Pat. No. 5,638,337.

[51] Int. Cl.$^6$ ............................................. G01V 1/40
[52] U.S. Cl. .................................. 367/27; 367/25; 367/73; 364/422
[58] Field of Search ................................ 367/25, 27, 73; 364/421, 422

[56] References Cited

U.S. PATENT DOCUMENTS 5,638,337  6/1997  Priest ................................. 367/27

OTHER PUBLICATIONS

Collins et al, 11th SPIE Reservoir Simulation Symp., Feb. 20, 1991, pp. 163–176; abst. only herewith.

Atlas Wireline Services Pamphlet, 1992, at 93–146, 10 pages.

LeBlanc et al, Oil Gas Journal, vol. 76, #4, pp. 69–70, Jan. 23, 1978; abst only herewith.

*Primary Examiner*—Nelson Moskowitz
*Attorney, Agent, or Firm*—Richard A. Fagin; Karen Tripp

[57] ABSTRACT

A method for using geometrical data to determine characteristics of a wellbore penetrating a subterranean formation is disclosed. The method involves converting data obtained from acoustic well logging into cartesian coordinates and solving a general quadratic equation by a least squares fit to an elliptical or circular model. More specific information, such as tensor strain and formation compaction along the wellbore may then be obtained from the geometrical data.

11 Claims, 5 Drawing Sheets

METHOD FOR COMPUTING BOREHOLE GEOMETRY FROM ULTRASONIC PULSE ECHO DATA

CROSS REFERENCE TO RELATED APPLICATIONS

This application is a continuation-in-part of application Ser. No. 08/690,776, filed on Aug. 1, 1996, assigned to the assignee of this application now U.S. Pat. No. 5,638,337.

BACKGROUND OF THE INVENTION

1. Field of the Invention

This invention relates to methods of determining information about a subterranean formation from data obtained from a wellbore penetrating the formation. The invention more particularly relates to logging geometric information about the wellbore.

2. Description of the Related Art

When fluid produced from subterranean wellbores decreases in volume, the supporting force in the formations above the production zone also decreases. If the formation is relatively soft, formation compaction may occur. In its worst form, compaction can completely destroy the productivity of a well. In lesser forms, compaction damages various components of the well. That is, when the formation compacts, the wellbore can undergo several deformation types. In cased holes, if the casing is sufficiently strong to prevent total collapse, compaction can cause the casing within the wellbore to either expand radially, or become elliptical, or can cause large radius bends to form in the wellbore. In some cases, the largest deformation of the casing seems to occur near the casing collars. In open holes, compaction can cause fracturing, chipping and total collapse.

Early detection of small deformations which indicate a tendency toward compaction, in the life cycle of a well allows time to change reservoir management procedures so as to avoid compaction later causing major deformations and damage to the well. Casing measurements during the life of the well enable such early detection of potential compaction problems. Geometric information about the borehole is one kind of information about the wellbore casing that can be used to accomplish such measurements.

Geometric information about an uncased wellbore is also useful in detecting stress within a formation typically caused by slow plastic flow of the formation and in indicating hardness changes between adjacent beds within a formation.

While it has long been known that two way travel time of an acoustic signal through a wellbore contains geometric information about the wellbore, methods of obtaining that information have not been reported. A need exists for ways to obtain geometric information about a wellbore.

SUMMARY OF THE INVENTION

The present invention models a well by locating an acoustic logging tool, which includes an acoustic transducer, within the well. Typically, the tool is provided with one or more centralizers to center the tool along the axis of the well. The transducer is normally positioned below the centralizer. If the well is curved or distorted, the axis of the transducer maybe eccentric relative to the axis of the tool.

In practicing the invention the transducer is typically rotated about its axis at any given location, and acoustic pulses are thereby directed at different points around the periphery of the well. The travel times of the pulses from the transducer to the wall of the well and back to the transducer are equivalent to the distances, depending on the speed of sound within the well fluids. Depending on the cross-sectional shape of the well, the travel times may very considerably. In accordance with the invention, the well cross-section at each logging location is fitted to an algebraic elliptical model, and constants in the algebraic equation are obtained from the data obtained from the logging observations. The elliptical models are generally developed based on coordinates associated with the transducer, but they may be moved to be associated with other vertical and lateral axes. A particularly useful model involves a model which places the center of the model at the center line or axis of the well.

Further useful logging data may be obtained by determining the curvature if any, along a well between the transducer and the locations of the centralizers on the logging tool. Acquisition of such data depends on the distances between transducer and each centralizer.

Thus, this invention provides a method for determining wellbore and subterranean formation characteristics from geometrical data. Geometrical information about the well and subterranean formation may be obtained from the solution to a general quadratic equation which is preferably based on an elliptical model and preferably solved by a least squares fit solution. Such geometrical information may include, for example, diagonal elements of a strain tensor and estimation of the compaction along the wellbore.

DETAILED DESCRIPTION OF A PREFERRED EMBODIMENT

This invention provides a method for using geometrical data to determine characteristics of a wellbore penetrating a subterranean formation, and more particularly, the subterranean formation itself. This method involves converting raw data obtained with an acoustic pulse imaging tool, which may be stored in polar coordinates, into cartesian coordinates. The raw data may also be in time units or other units which can be related to a distance, but which must be converted into radius units, and in turn must be converted into cartesian coordinates. Once the data is in cartesian coordinates, arrays may be generated for resolution of a least squares fit to a general quadratic form, which will be an ellipse or a circle because of the geometry of a borehole. From the least squares fit to an ellipse or circle, geometrical information about the wellbore may be obtained. From that geometrical information, more specific information may be obtained using major and minor axes and eccentering information. Such more specific information includes diagonal elements of a strain tensor and compaction along the wellbore. Compaction may be estimated from major and minor axes results and curvature and torsion may be estimated from eccentering results.

In the method, ultrasonic pulse echo data is taken from the wellbore using an acoustic pulse imaging tool, such as, for example, the CBIL™, described in "The Digital Circumferential Borehole Imaging Log—CBIL," Atlas Wireline Services, Houston, Tex. (1993). The data includes at least the time of arrival and amplitude of the first return echo for each acoustic transmission. U.S. patent application Ser. No. 08/674,485 [Attorney Docket No. AW 9620] filed Jul. 2, 1996, of John F. Priest, entitled "Method For Logging Behind Casing" provides a method for obtaining such data and is incorporated herein by reference. With this data, taking into account the known speed of sound within the wellbore fluid and the geometry of the ultrasonic transducer assembly, the two way travel time of the pulse echo signal may be convened to radius information.

Preferably, the ultrasonic transducer in the acoustic pulse imaging tool is radially scanned about the instrument axis in the wellbore to enable a set of first return times from which a set of such radii relating the acoustic tool to the wellbore may be obtained, as taught in U.S. patent application Ser. No. 08/674,485 at equation 3, p. 14. For purposes of this invention, the wellbore geometry is assumed to satisfy the following general quadratic equation in two dimensions:

$$ax^2 + by^2 + cxy + dx + ey + f = 0 \quad (1)$$

where a, b, c, d, e and f are general coefficients used to illustrate the form of the equation for the purposes of this equation only. For the general case, a (of equation 1) is assumed to be greater than zero, so equation (1) can be written as:

$$x^2 + Axy + By^2 + Cx + Dy + E = 0 \quad (2)$$

To model the wellbore as a circle, A=1, B=0, this equation (2) reduces to:

$$x^2 + y^2 + Ax + By + C = 0 \quad (3)$$

To model the wellbore as an ellipse, the general equation in its proper coordinate system is:

$$\frac{(x+x_c)^2}{a} + \frac{(y+y_c)^2}{b} = 1 \quad (4)$$

where $(x_c, y_c)$ is the center coordinate for the ellipse, and a and b are the semi-major and semi-minor axes, with the larger of (a, b) being the semi-major axis. [This definition of a and b is not related to a and b in equation 1]. The proper coordinate system is that coordinate system in which the major and minor axes are parallel to the (x, y) and (y, x) axes respectively of the coordinate system. If a=b, then equation (4) describes a circle. The equation expands to the form of equation (2) when a=0:

$$(x+x_c)^2 + \frac{a^2}{b^2}(y+y_c)^2 = a^2 \quad (5)$$

Equation (5) may be, expanded as follows:

$$x^2 + 2xx_c + x_c^2 + \frac{a^2}{b^2}y^2 + 2\frac{a^2}{b^2}yy_c + \frac{a^2}{b^2}y_c^2 - a^2 = 0 \quad (6)$$

which is of the form of equation (2) when:

$$A = 0 \quad (7)$$

$$B = \frac{a^2}{b^2}$$

$$C = 2x_c$$

$$D = 2\frac{a^2}{b^2} y_c$$

$$E = x_c^2 + \frac{a^2}{b^2} y_c^2 - a^2$$

In general, "A" in equation (2) will not be zero when the ellipse is rotated through some angle α, and α will also not be zero. To calculate the solution of the general equation (2), the following substitutions should be made into the general equation (2):

$$x = u\cos(\alpha) - v\sin(\alpha) \quad y = u\sin(\alpha) + v\cos(\alpha) \quad (8)$$

which perform a coordinate rotation about the z-axis through the angle α. Substituting into equation (2) yields:

$$\begin{aligned} 0 = & [u\cos(\alpha) - v\sin(\alpha)]^2 + \\ & A[u\cos(\alpha) - v\sin(\alpha)] - \\ & [u\sin(\alpha) + v\cos(\alpha)] + \\ & B[u\sin(\alpha) + v\cos(\alpha)]^2 + \\ & C[u\cos(\alpha) - v\sin(\alpha)] + \\ & D[u\sin(\alpha) + v\cos(\alpha)] + \\ & E \end{aligned} \quad (9)$$

By collecting on terms for u and v, the equation becomes:

$$\begin{aligned} 0 = & [B\sin(\alpha)^2 + A\sin(\alpha)\cos(\alpha) + \cos(\alpha)^2]u^2 + \\ & [A\cos(\alpha)^2 - A\sin(\alpha)^2 - 2\sin(\alpha)\cos(\alpha) + \\ & 2B\sin(\alpha)\cos(\alpha)]uv + \\ & [C\cos(\alpha) + D\sin(\alpha)]u + \\ & [\sin(\alpha)^2 + B\cos(\alpha)^2 - A\sin(\alpha)\cos(\alpha)]v^2 + \\ & [-C\sin(\alpha) + D\cos(\alpha)]v + \\ & E \end{aligned} \quad (10)$$

For the ellipse to be in its proper form, that is, for A=0 the term in uv must vanish:

$$[A\cos(\alpha)^2 - A\sin(\alpha)^2 - 2\sin(\alpha)\cos(\alpha) + 2B\sin(\alpha)\cos(\alpha)]uv = 0 \quad (11)$$

Since u and v cannot be zero in general, the term depending on α must vanish:

$$A\cos(\alpha)^2 - A\sin(\alpha)^2 - 2\sin(\alpha)\cos(\alpha) + 2B\sin(\alpha)\cos(\alpha) = 0 \quad (12)$$

By collecting terms and substituting the trigonometric identities:

$$\sin(2\alpha) = 2\sin(\alpha)\cos(\alpha) \quad \cos(2\alpha) = \cos(\alpha)^2 - \sin(\alpha)^2 \quad (13)$$

into equation (12), the equation becomes:

$$A\cos(2\alpha)+(B-1)\sin(2\alpha)=0 \quad (14)$$

Solving equation 14 for α yields:

$$\alpha = \frac{1}{2}\tan^{-1}\left(\frac{A}{1-B}\right) \quad (15)$$

where the term "−1" indicates the arc-tangent of the argument. When α is determined by equation (15), then equation 12 is satisfied and equation (10) becomes:

$$0 = [B\sin(\alpha)^2 + A\sin(\alpha)\cos(\alpha) + \cos(\alpha)^2]u^2 + \quad (16)$$
$$[C\cos(\alpha) + D\sin(\alpha)]u +$$
$$[\sin(\alpha)^2 + B\cos(\alpha)^2 - A\sin(\alpha)\cos(\alpha)]v^2 +$$
$$[-C\sin(\alpha) + D\cos(\alpha)]v +$$
$$E$$

Equation (16) may be expressed in the form of equation (2), as follows:

$$0 = u^2 + \frac{C\cos(\alpha) + D\sin(\alpha)}{B\sin(\alpha)^2 + A\sin(\alpha)\cos(\alpha) + \cos(\alpha)^2} u + \quad (17)$$
$$\frac{\sin(\alpha)^2 + B\cos(\alpha)^2 - A\sin(\alpha)\cos(\alpha)}{B\sin(\alpha)^2 + A\sin(\alpha)\cos(\alpha) + \cos(\alpha)^2} v^2 +$$
$$\frac{-C\sin(\alpha) + D\cos(\alpha)}{B\sin(\alpha)^2 + A\sin(\alpha)\cos(\alpha) + \cos(\alpha)^2} v +$$
$$\frac{E}{B\sin(\alpha)^2 + A\sin(\alpha)\cos(\alpha) + \cos(\alpha)^2}$$

Equating like powers of u and v with like powers of x and y, the coefficients of equation (2) become, in a proper coordinate system for the ellipse:

$$A' = 0 \quad (18)$$
$$B' = \frac{\sin(a)^2 + B\cos(a)^2 - A\sin(a)\cos(a)}{B\sin(a)^2 + A\sin(a)\cos(a) + \cos(a)^2}$$
$$C' = \frac{C\cos(a) + D\sin(a)}{B\sin(a)^2 + A\sin(a)\cos(a) + \cos(a)^2}$$
$$D' = \frac{-C\sin(a) + D\cos(a)}{B\sin(a)^2 + A\sin(a)\cos(a) + \cos(a)^2}$$
$$E' = \frac{E}{B\sin(a)^2 + A\sin(a)\cos(a) + \cos(a)^2}$$

The primes in equation (18) indicate a rotated coordinate system. Equation (2) may now be solved for its coefficients using a minimized least squares fit, and equations (18) and (7) may be used to determine the coefficients in equation (4), using the rotation angle α from equation (15). Solving equation (4) for a, b, $x_c$ and $y_c$ yields:

$$a^2 = \frac{1}{4}C'^2 + \frac{1D'^2}{4B'} - E' \quad (19)$$
$$b^2 = \frac{1}{B'}\left(\frac{1}{4}C'^2 + \frac{1'D^2}{4B'}E'\right) + \frac{a^2}{B'}$$
$$x_c = \frac{1}{2}C'$$
$$y_c = \frac{1D'}{2B'}$$

Next, the coefficients, A, B, C, D, E are determined. There are several methods for determining the coefficients of the general quadratic equation (2) from an over determined data set whose values are assumed to lie on the curve generated by the general quadratic equation (2). One of the best methods is the minimized least squares fit to the data.

The following treatment of a matrix solution to a least squares fit assumes an equation of the form:

$$x^2 = f(x,y) \text{ If } R, \theta \text{ are input instead of } x, y \text{ then } \quad x = R(\theta)\cos\theta \quad (20)$$
$$y = R(\theta)\sin\theta$$

where (x,y) are independent variables, in a right handed coordinate system, R is the radius to the point x and y, and θ is a right hand rotation about the positive z-axis, measured from the x-axis.

Equation 2 can be written in the form:

$$-x^2 = Axy + By^2 + Cx + Dy + E \quad (21)$$

where $x^2$ is treated as the dependent variable.

To perform a least squares fit, the following arrays of data should be generated using the input coordinate pairs $(x_n, y_n)$:

$$M = \begin{pmatrix} x_0 y_0 & y_0^2 & x_0 & y_0 & 1 \\ x_1 y_1 & y_1^2 & x_1 & y_1 & 1 \\ x_2 y_2 & y_2^2 & x_2 & y_2 & 1 \\ \cdot & \cdot & \cdot & \cdot & \cdot \\ \cdot & \cdot & \cdot & \cdot & \cdot \\ \cdot & \cdot & \cdot & \cdot & \cdot \\ x_{n-1} y_{n-1} & y_{n-1}^2 & x_{n-1} & y_{n-1} & 1 \\ x_n y_n & y_n^2 & x_n & y_n & 1 \end{pmatrix} \quad X2 = \begin{pmatrix} -x_0^2 \\ -x_1^2 \\ -x_2^2 \\ \cdot \\ \cdot \\ \cdot \\ -x_{n-1} \\ -x_n^2 \end{pmatrix} \quad (22)$$

where $x_n$ and $y_n$ are the rectilinear coordinates of each of the radius measurements for one (or more, albeit one is preferred) complete revolution of the transducer.

Given this definition of the array, then a minimized least squares fit to the data can be computed using the following matrix equation:

$$C = (M^T M)^{-1}(M^T X2) \quad (23)$$

where $$C = \begin{pmatrix} C_0 \\ C_1 \\ C_2 \\ C_3 \\ C_4 \end{pmatrix} = \begin{pmatrix} A \\ B \\ C \\ D \\ E \end{pmatrix} \quad (24)$$

are the coefficients of equations (2) and (21), the "T" is matrix transposition, "−1" is matrix inversion, and "M" means matrix.

While equation (23) can be solved by matrix operations indicated above, truncation and round off errors can occur when executed on digital computers with less than infinite word lengths and numerical overflow errors can occur if the matrix inversion is singular. However, in general, the first term in equation (23) will be non singular for the case of the wellbore geometrical model if the radii data is reasonable, i.e., if the wellbore is a closed surface and the data does not go to infinity and can be estimated by second order by an elliptical solution. There are several methods of solving equation (23), including as taught in NUMERICAL RECIPES IN FORTRAN by S. A. Teukolsky, W. T. Vettering and B. P. Flannery, 2d ed., W. H. Press (1992), LU decomposition at pages 34–42, Gaussian-Jordan Elimination at pages 27–34, Choelsky decomposition at pages 89–91, QR decomposition at pages 91–95, or Singular Value Decomposition (SVD) at pages 670–675. SVD decomposition is generally preferred since it avoids problems with singularities, and eliminates round off problems.

Once equation (23) has been solved using one of the several techniques for computing the coefficients of equations (2) or (21), then by substitution into equations (15), (18) and (7) the coefficients of equation (4) can be computed. The coefficients of equation (4) are the desired ellipse and eccentering parameters. The orientation of the ellipse is determined by α from equation (15). For consistency in the orientation of the ellipse, the orientation is defined as the angle from the instrument x-axis to the closest (in angle) semi-major axis element. However, since the solution above does not distinguish the semi-major and semi-minor axes of the ellipse, one final check must be made to determine the major axis, and the orientation. The larger of (a,b) is the semi-major axis length, while the smaller is the semi-minor axis length. Also the angle α is measured from the instrument axis to a, so that if a is the semi-minor axis, the ellipse orientation is in error by 90°. Also since the ellipse has bi-lateral symmetry, the orientation of the ellipse can be defined with an angle between 0° and 180°; therefore, the orientation angle plus 90° modulo 180, when a is not the major axis, will give the orientation of the ellipse. If α is negative then α+360° modulo 180 will give the orientation of the ellipse.

Figure 1:
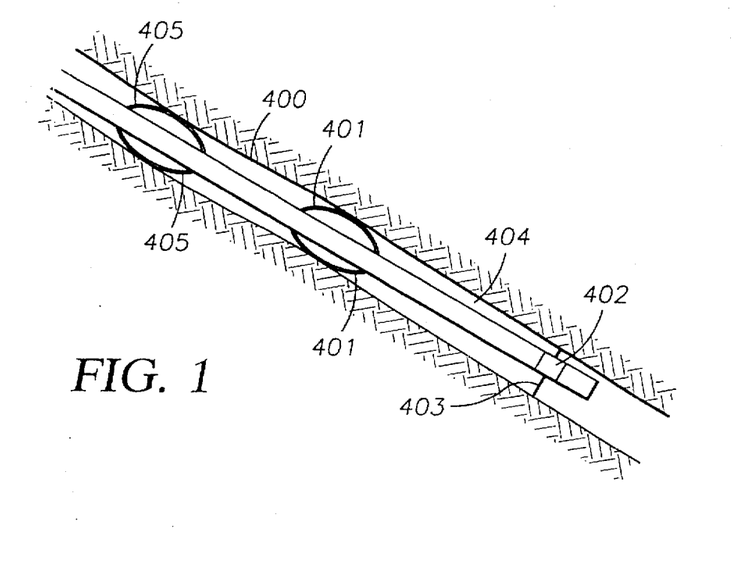
FIG. 1 depicts an acoustic logging imaging tool containing an ultrasonic sensor deployed within a slanted wellbore.

FIG. 1 shows an ultrasonic sensor 402 and sensor body 404 configured within a wellbore 400 for measuring wellbore bend radius. The sensor body 404 is supported near the center of the wellbore, for this example with two sets of standoffs or centralizers 401 and 405. Ideally, the centralizers keep the sensor housing at the exact center of the wellbore 400 at their points of contact. The ultrasonic sensor 402 hangs freely relative to the wellbore 400. Where the sensor moves through a curved section of wellbore 400 the sensor 402 becomes eccentered with respect to the wellbore 400, while the sensor body 404 is constrained to be centered within the wellbore 400 at the center of each set of centralizers 401 and 405. If the distance between the transducer in the sensor 402 and each of the centralizers 401 and 405 is known, the wellbore bend radius may be estimated, as discussed below.

Figure 2:
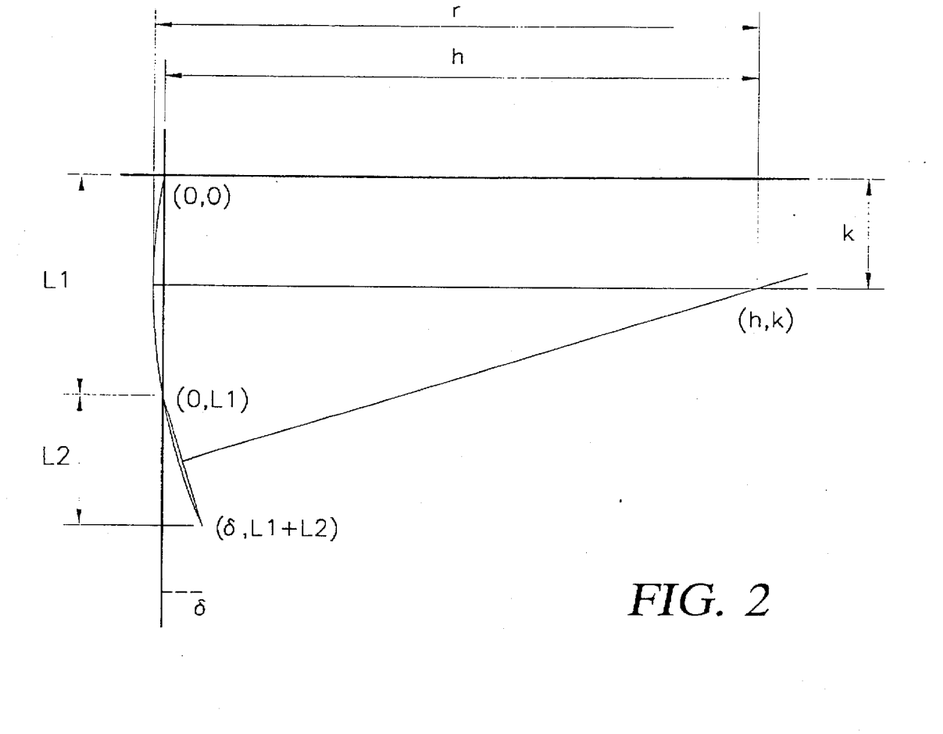
FIG. 2 illustrates a coordinate system for an ultrasonic sensor in an acoustic logging imaging tool deployed within a wellbore.

Referring to FIG. 2, define a coordinate system in which the z-axis is along the sensor body 404, and z is positive down. Define the x-axis to be perpendicular to the z-axis of the acoustic sensor 402 at the upper centralizer 401. The coordinates of the upper centralizer 401 are (0, 0). The coordinates of the lower centralizer 405 are (0, L1), given that L1 is the distance between the centralizers 401 and 405 and since by definition the acoustic sensor 402 is parallel to the wellbore 400 at the centralizers 401 and 405. The coordinates of the transducer are (δ, L1+L2), wherein L2 is the distance between the transducer and the lower centralizer 405.

Another form of the general equation of a circle as follows:

$$(x-h)^2 + (z-k)^2 = r^2 \quad (25)$$

substituting in the coordinates for the three points above $$h^2 + k^2 = r^2 \qquad x=0 \quad z=0 \quad (26)$$
$$h^2 + (L1-k)^2 = r^2 \qquad x=0 \quad z=L1$$
$$(\delta - h)^2 + (L1+L2-k)^2 = r^2 \qquad x=0 \quad z=L2$$

Since there are three equations and three unknowns it is possible to solve for h, k and r. Using the first two equations in (26) and solving for k: therefore, $$h^2 + y^2 = h^2 + (L1-k)^2 \quad (27)$$

$$k = \frac{1}{2} L1 \quad (28)$$

as expected for a perpendicular bisector of a line segment. Using the second and third equations of (26)

$$h^2 + \left(L1 - \frac{1}{2} L1\right)^2 = (\delta - h)^2 + \left(L1 + L2 - \frac{1}{2} L1\right)^2; \quad (29)$$

solving for h:

$$h = \frac{1}{2\delta} (L2^2 + L1L2 + \delta^2); \quad (30)$$

substituting the results of equations (28) and (30) into the first equation of (26); and solving for r; will complete the solution:

$$\frac{1}{2\delta} (L2^2 + L1L2 + \delta^2)^2 + \left(\frac{1}{2\delta} LS\right)^2 = r^2 \quad (31)$$

Therefore, the following equation applies where the curvature k is displayed rather than the wellbore bend radius, which diverges as δ approaches zero:

$$k = \frac{1}{r} = \frac{\pm 2\delta}{\sqrt{\delta^2 + L2^2} \sqrt{\delta^2 + (L1+L2)^2}} \quad (32)$$

Equation (32) shows that physical meaning can be developed from the measured eccentering of the transducer within the wellbore. This equation assumes that the position of the sensor body 404 at the centralizers 401 and 405 can be held to the center of the wellbore 400. In the field, however, centralizers do not perfectly centralize the acoustic sensor within the wellbore. Thus, the solution of equation (32) represents only an approximate solution. Also, the exact lengths of L1 and L2 are not usually precisely known because centralizers typically have some freedom of motion along the axis of the acoustic sensor. Further, the solution assumes that the centralized acoustic sensor and the direction of eccentering are in the same plane. Thus, no information is available from equation (32) about the torsion or twist of the radii of curvature.

The curvature and torsion may be estimated directly from the eccentering curve itself by assuming that the acoustic sensor maintains an average eccentering, which is locally constant, and which is oriented toward the low side of the wellbore. Centralizers are typically made of spring steel, which when the tool moves along the borehole may allow the acoustic sensor to bounce at a high frequency when compared to normal wellbore (or borehole) bending. Define a local bore coordinate system in which the z-axis is along the wellbore, the x-axis is up and the y-axis forms a right hand coordinate system. If the acoustic sensor contains an orientation device which can locate the high side of the wellbore, then the acoustic sensor local body reference coordinate system can be rotated into the wellbore local vertical coordinate system. By rotating the acoustic sensor tool body measurements of the eccentering x and y axis components into the local vertical coordinate system, the eccentering due to gravity should be entirely in the x-axis and the y-axis should have a mean zero eccentering. By filtering the x and y axis eccentering data in the wellbore local vertical coordinate system, the high frequency components of the eccentering can be eliminated, leaving the residual eccentering caused by the wellbore curvature and torsion. The residual eccentering is removed by taking a local or sliding or moving average of the x-axis data and subtracting the local average from the filtered x-axis data. The local or sliding average will depend on the stiffness of the centralizers primarily and the averaging or filter broadwidth should exceed several cycles of the centralizer bounce.

Figure 3:
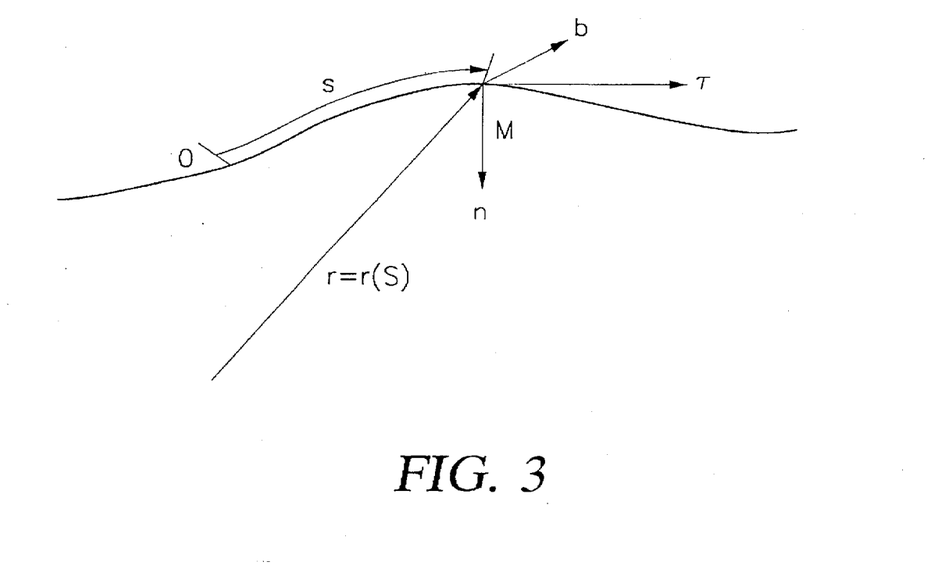
FIG. 3 illustrates the generalized coordinate system for the curvature and torsion of the wellbore.

The following equation is a directed space curve, referring to FIG. 3

$$r=r(s) \tag{33}$$

where r is the radius vector of a variable point M, s is the arc length measured from some fixed point on the curve, and s increases in the direction chosen to be positive. At each point M there is a unique trihedral consisting of the unit tangent t, the unit normal n, and the unit binormal b. The unit tangent vector is defined by:

$$t = \frac{dr}{ds} \tag{34}$$

The vector n is orthogonal to t and lies in the osculating plane at M pointing in the direction of concavity of the curve, and the binormal b is defined as the vector product:

$$b = t \times n \tag{35}$$

The curvature can be computed from:

$$\kappa^2 = \frac{(\dot{r} \times \ddot{r}) \cdot (\dot{r} \times \ddot{r})}{(\dot{r} \times \dot{r})^3} \tag{36}$$

The torsion $\tau$ can be computed from the following equation:

$$\tau = \frac{\dddot{r} \cdot (\dot{r} \times \ddot{r})}{(\dot{r} \times \ddot{r}) \cdot (\dot{r} \times \ddot{r})} \tag{37}$$

The binormal vector b can be computed from the following equation:

$$b = \frac{\dot{r} \times \ddot{r}}{|\dot{r} \times \ddot{r}|} \tag{38}$$

Further discussion of equations 33–38 and curvature and torsion may be found in VECTOR AND TENSOR ANALYSIS WITH APPLICATIONS by A. I. Borisenko and I. E. Tarapov, Dover (1979) and in LECTURES ON CLASSICAL DIFFERENTIAL GEOMETRY by J. Dirk Struik, 2d ed., Dover (1988).

The normal vector n can be computed from the following equation:

$$n = b \times t \tag{39}$$

The single, double and triple over dots in equations 36, 37 and 38 imply first, second and third derivatives respectively. The equations (36) through (38) are convenient computational forms since the numerical derivatives of r can easily be computed, and the arc length parameter is not needed. The derivatives can be estimated for digitized data using the following differential equations, where it is assumed that the time increment between adjacent data points is constant, that is $t_n - t_{n-1} = t_{n-1} - t_{n-2}$, etc.:

$$\frac{dr}{ds} = \frac{dr}{|dr|} = \frac{r_n - r_{n-1}}{|r_n - r_{n-1}|} \tag{40}$$

and $$\dot{r} = \frac{dr}{dt} \quad \ddot{r} = \frac{d^2r}{dt^2} \quad \dddot{r} = \frac{d^3r}{dt^3} \tag{41}$$

$$\dot{r} = \frac{r_{n+1} - r_{n-1}}{2(t_n - t_{n-1})} \quad \ddot{r} = \frac{r_{n+1} - 2r_n + r_{n-1}}{(t_n - t_{n-1})^2}$$

$$\dddot{r} = \frac{r_{n+2} - 2r_{n+1} + 2r_{n-1} + r_{n-2}}{2(t_n - t_{n-1})^3}$$

The derivatives in this form require one or two data points above and below (or prior and following) the current position. Therefore, any implementation of this method should accommodate this, and should recognize that for n=1,2 and N−1,N there is no valid solution. N is the total number of independent elliptical data subsets in the entire data set. Upon substituting for the derivatives (41) into equations (36) through (38), the terms in dt cancel out, requiring only the derivatives of r to compute the curvature, torsion and binormal unit vector. For example, equation (36) is rewritten below with $r_n$ as the nth vector position of the three dimensional curve represented by r:

$$\kappa^2 = \frac{\left(\frac{r_{n+1}-r_{n-1}}{2(t_n-t_{n-1})} \times \frac{r_{n+1}-2r_n+r_{n-1}}{(t_n-t_{n-1})^2}\right) \cdot \left(\frac{r_{n+1}-r_{n-1}}{2(t_n-t_{n-1})} \times \frac{r_{n+1}-2r_n+r_{n-1}}{(t_n-t_{n-1})^2}\right)}{\left(\frac{r_{n+1}-r_{n-1}}{2(t_n-t_{n-1})} \cdot \frac{r_{n+1}-r_{n-1}}{2(t_n-t_{n-1})}\right)^3} \tag{42}$$

$$\kappa^2 = \frac{[(r_{n+1}-r_{n-1}) \times (r_{n+1}-2r_n+r_{n-1})] \cdot [(r_{n+1}-r_{n-1}) \times (r_{n+1}-2r_n+r_{n-1})]}{[(r_{n+1}-r_{n-1}) \cdot (r_{n+1}-r_{n-1})]^3} \tag{43}$$

The vector r is determined from the $x_c$ and $y_c$, in equation (19) and the distance moved by the tool between levels n and n−1, as follows:

$$r_n = x_n i + y_n j + z_n k \tag{44}$$

where i, j, and k are unit vectors in the x, y and z directions respectively, $$x_n = \sum_{i=1}^{n} [x_i - x_{i-1}] \tag{45}$$

$$y_n = \sum_{i=1}^{n} [y_i - y_{i-1}]$$

$$z_n = z_0 + \sum_{i=1}^{n} dz$$

and where the 'c' subscripts in equation (19), have been suppressed. The initial z-axis coordinate is $z_0$ at the start of the data set, and the distance over which the tool moves between samples n and n−1 is dz. The difference term in the summations for x and y is used to determine the relative displacement between sample levels or consecutive positions of the acoustic sensor which are then summed to get the total displacement at sample n. If the tool moves, as in this application, on a conveyance system which measures the distance along the well bore, ds is determined and then dz must be calculated from ds as follows:

$$dz = \sqrt{ds_i^2 - (x_i - x_{i-1})^2 - (y_i - y_{i-1})^2} \quad (46)$$

The following equation substitutes equation 46 into equation 45 to compute z:

$$x_n = \sum_{i=1}^{n} [x_i - x_{i-1}] \quad (47)$$

$$y_n = \sum_{i=1}^{n} [y_i - y_{i-1}]$$

$$z_n = z_0 + \sum_{i=1}^{n} \sqrt{ds_i^2 - (x_i - x_{i-1})^2 - (y_i - y_{i-1})^2}$$

where equations (44) and (47) define the vector $r_n$.
Equation (37) can be expressed in terms of the $r_n$ as follows:

$$\tau = \frac{\frac{r_{n+1} - r_{n-1}}{2(t_n - t_{n-1})} \cdot \left\{ \frac{r_{n+1} - 2r_n + r_{n-1}}{(t_n - t_{n-1})^2} \times \frac{r_{n+2} - 2r_{n+1} + 2r_{n-1} - r_{n-2}}{2(t_n - t_{n-1})^3} \right\}}{\left\{ \frac{r_{n+1} - r_{n-1}}{2(t_n - t_{n-1})} \times \frac{r_{n+1} - 2r_n + r_{n-1}}{(t_n - t_{n-1})^2} \right\} \cdot \left\{ \frac{r_{n+1} - r_{n-1}}{2(t_n - t_{n-1})} \times \frac{r_{n+1} - 2r_n + r_{n-1}}{(t_n - t_{n-1})^2} \right\}} \quad (48)$$

which is the same as:

$$t = \frac{[r_{n+1} - r_{n-1}]\{[r_{n-1} - 2r_n + r_{n-1}] \times [r_{n+2} - 2r_{n+1} + 2r_{n-1} - r_{n-2}]\}}{\{[r_{n+1} - r_{n-1}] \times [r_{n+1} - 2r_n + r_{n-1}]\} \cdot \{[r_{n+1} - r_{n-1}] \times [r_{n+1} - 2r_n + r_{n-1}]\}} \quad (49)$$

With similar substitutions, the tangent vector τ and the binormal vector b can be calculated, and the normal vector can be calculated by equation (39). The three unit vectors are computed to provide an orientation reference for future coordinate transformations. All of these calculations up to this point are preferably performed in the local tool body centered coordinate system. Other meaningful coordinate orientations are: the positive x-axis directed toward the wellbore high side or low side with the z-axis along the wellbore, and the x-axis directed toward either magnetic or true north, with respect to the z-axis vertical. Methods for performing these rotations are known.

The relative strain on the casing may be estimated using semi-major, semi-minor and average radii. Assume that the strain on a casing is zero when the casing is perfectly circular, and that the radius of a length of the casing is uniform. Stress induced deformation in the casing will then be an indicator of the strain on the casing. The strain is loosely defined as the change in distance with respect to distance, or more rigorously as follows:

$$S_{ii} = \frac{\partial u_i}{\partial j} \quad (50)$$

$$S_{ij} = \frac{1}{2}\left( \frac{\partial u_i}{\partial j} + \frac{\partial u_j}{\partial i} + \frac{\partial u_k}{\partial i} \frac{\partial u_k}{\partial j} \right)$$

where, $u_1$ (i.e., $u_x$, $u_y$ and $u_z$) are the displacements in the x, y and z direction in the local cartesian coordinate system defined by the x, y and z axes and where i, j and k cyclically permute through coordinate axes x, y and z:

$$i = x, y, z \quad j = y, z, x \quad k = z, x, y \quad (51)$$

For small displacements, the third term in the second in equation (50) is usually ignored since it is of second order in displacement, and equation (50) becomes $$S_{ii} = \frac{\partial u_i}{\partial i} \quad (52)$$

$$S_{ij} = \frac{1}{2}\left( \frac{\partial u_i}{\partial j} + \frac{\partial u_j}{\partial i} \right)$$

Further discussion about strain and background information related to equations 50–52 may be found in ACOUSTIC WAVES: DEVICES, IMAGING AND ANALOG SIGNAL PROCESSING by Gordon S. Kino, Prentice Hall (1987) at pages 75–83 and in VECTOR AND TENSOR ANALYSIS WITH APPLICATIONS by A. I. Borisenki and I. E. Tarapov, Denver (1979). In the wellbore 400 of FIG. 2, $S_{xx}$ and $S_{yy}$ can be related to the major and minor axes of the ellipse above, so that $$S_{xx} = \frac{A - r}{r} \quad (53)$$

$$S_{yy} = \frac{B - r}{r}$$

where A and B are semi-major and semi-minor axes respectively and r is the original radius of the section of the borehole. Applying Poisson's ratio, which relates $S_{xx}$ to $S_{zz}$:

$$S_{xx} = \sigma S_{zz} \quad (54)$$

where the parameter σ is called Poisson's ratio, Poisson's ratio is equal to 0.5 for a liquid and varies from 0 to 0.5 for solids. For the materials commonly encountered in geology, Poisson's ratio is typically estimated to be about 0.25 in seismic work, as reported in ACOUSTIC WAVES: DEVICES, IMAGING AND ANALOG SIGNAL PROCESSING by Gordon S. Kino, Prentice Hall (1987) at page 89. This value is typical for ceramic materials and many types of rock. The zz component of the strain tensor can be estimated or calculated using the following equation:

$$S_{zz} = \frac{-1}{\sigma} \left\{ \frac{\sqrt{AB} - r}{r} \right\} \qquad (55)$$

where the deformation in the x-, y-plane is estimated by the geometric mean (i.e., $\sqrt{AB}$) of the semi-major and semi-minor axes. The deformation could also be estimated by the arithmetic mean, $(A+B)/2$; however, the geometric mean gives the radius of a circle of equal area to the ellipse, and therefore, has physical significance. Equations (53) and (55) provide estimates of the longitudinal stress in the x, y and z directions, (in the local ellipse coordinate system). Integrating the displacements along the z-axis over some interval results in an estimate of the compaction along the bore hole trajectory. If the trajectory of the bore hole is known, then it is possible to compute the vertical compaction of the formation.

$$c_n = \sum_{i=0}^{n} s_{zz_i} \times ds_i \qquad (56)$$

At this point, the following parameters can be calculated from the discussion above: the eccentering in acoustic sensor body coordinates, in either x and y displacements or radius and direction; the major and minor axes of the ellipse; the orientation of the ellipse; the eccentricity; the bore hole curvature; the bore hole torsion; and the longitudinal strain components of the strain tensor. However, still more information may be obtained from the geometrical data. Using the ellipse data, it is also possible to correct the acoustic travel time and radius images, which may be generated from the measurements of the two way transit times from the transducer to the formation and back. Using the eccentering data, a "centered" radius image may be constructed which is the image that would have been produced if the tool had been perfectly centered. If each radius (or travel time) measurement is resolved into its x and y components, and the corresponding eccentering component subtracted from the corresponding axis, then a centered image is produced. For the travel time, the radius of eccentering must be converted to time units using the speed of sound in the well bore fluid. A "flattened image", in which the image is both centered and the eccentricity has been removed, may also be produced. The advantage of this image enhancement is to enhance small, local changes in the wellbore shape, changes which would otherwise generally be obscured by larger changes in either eccentering or ellipticity. Such a "flattened image" may be obtained from generating a modeled image of the bore hole using the ellipse and eccentering image, subtracting the modeled image point by point from the original image, and adding to the result an estimate of the average radius of the ellipse, e.g. $(A+B)/2$, the square root of $AB$, or the average of the modeled data.

For example, the Western Atlas Logging Services CBIL™ acquires data by scanning radially in equal angle increments, and returns a two way travel time for the pulse echo signal traversing the wellbore fluid. For each travel time measurement an angle is implied by the index position of the radial scan, that is:

$$\theta_i = \frac{i-1}{N} 360° \qquad (57)$$

where i is the indexed position within one revolution of the sensor, and N the number of samples taken per revolution. Using the angle from equations (57), (61), and (2), the coefficients from equation (24), and the transformation from the $(R, \theta)$ coordinate system, equation (20), the modeled radii can be calculated. Substituting the transformations equation (20), into equation (2) and ignoring the subscript i on $\theta$ yields:

$$r^2*\cos(\theta)^2 + A*r^2*\cos(\theta)*\sin(\theta) + B*r^2*\sin(\theta)^2 + C*r*\cos(\theta) + D*r*\sin(\theta) + E = 0 \ [\cos(\theta)^2 + A*\cos(\theta)*\sin(\theta) + B*\sin(\theta)]*r^2 + [C*\cos(\theta) + D*\sin(\theta)]*r + E = 0 \qquad (58)$$

The equation is now a quadratic form in r, and solving for r yields:

$$r(\theta) = -C*\cos(\theta) - D*\sin(\theta) \pm \qquad (59)$$

$$\sqrt{(C^2 - 4*E)*\cos(\theta)^2 + 2*(C*D - 2*B*E)*\sin(\theta) + (D^2 - 4*E*B)*\sin(\theta)^2}$$

A flattened and centered image will be produced from computing equation (59) for each coordinate pair and selecting the $r(\theta)$ which is greater than or equal to b and less than or equal to a. Restoring the subscription $\theta$, and subtracting the solution from the radius value measured at the angle $(\theta_1)$ yields:

$$rf_i = r_i - r(\theta_i) + r_{avg} \qquad (60)$$

where $r_{avg}$ is the estimated average diameter of the wellbore at the depth for which the elliptical data is being computed, and $r_i$ is the measured radius at the angle $\theta$. The average radius may be estimated from the major and minor axes by taking either the geometric or arithmetic mean. While not absolutely necessary, the average radius is added to the flattened data to reflect the nominal radii information for the wellbore.

Aberrations caused by the scanning techniques of a rotating acoustic sensor may also be corrected. If the acoustic sensor rotates at a uniform angular rate, then eccentering causes a distortion of features on the wellbore wall. Features which are closer to the acoustic sensor are sampled with a smaller sampling distance than features which are farther away. For example, a flat bedding plane crossing a perfectly circular bore hole at an angle will form a perfect sinusoid. If the acoustic sensor is not perfectly centered, then the sinusoid will no longer be perfectly sinusoidal. A correction from the equal angle observation to an equal arc length observation can be made by using the law of sins, and the eccentering radius and direction.

Figure 4:
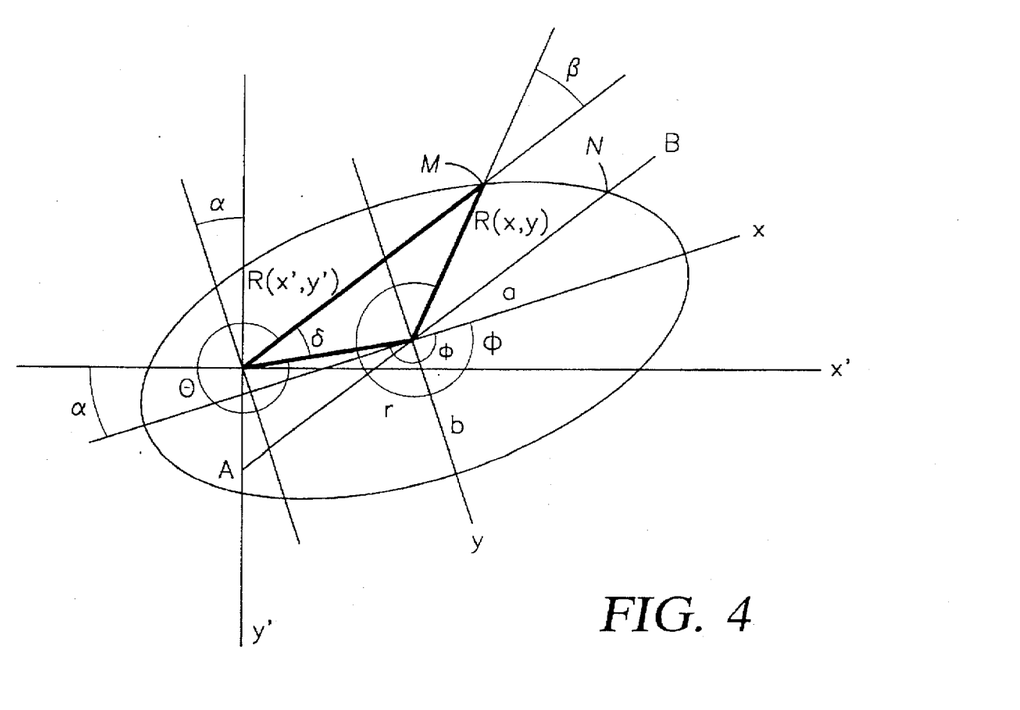
FIG. 4 illustrates the geometry for correction of eccentering distortion.

Referring to FIG. 4, $\alpha$ is the angle between the vector position R(x', y') from the ultrasonic sensor to the point M on the ellipse which is defined by the semi-minor axis a and the semi-minor axis b, and the radius vector r from the center of the ellipse (x=0, y=0) to the position of the ultrasonic sensor (x'=0, y'=0). The angle $\theta$ is the measurement angle from the acoustic sensor x-axis to the point M on the ellipse. The angle $\alpha$ is the angle of rotation of the acoustic sensor body coordinate system, and the ellipse "proper" coordinate system. The angle $\Phi$ is the angle from the ellipse x-axis to the radius vector R(x, y) from the center of the ellipse to the point M. The angle $\beta$ is the angle between the radius vectors R(x', y') and R(x, y), and is equal to the angular position error which occurs when the image is translated to the center of the ellipse, with respect to the line AB which is parallel to R(x', y') and which passes through the center of the ellipse. The point N becomes the apparent position of M following the translation. In order to correctly place data at M in the original data set, the data must be placed at N in the centered data set. Therefore, the correct position of the data acquired by the acoustic sensor at M is at the angle $\Phi+\beta$, rather than $\Phi$. Define the angle $\psi=\Phi-\phi$ which is the angle opposite R(x', y'), and using the law of sins:

$$\frac{R(x',y')}{\sin\Psi} = \frac{r}{\sin\beta} \qquad (61)$$

and $$\frac{R(x',y')}{\sin(\Phi-\phi)} = \frac{r}{\sin\beta} \qquad (62)$$

solving for $\beta$ in equation (62), the correction angle, the following equation results:

$$\beta = \tan^{-1}\left\{\frac{\frac{r}{R(x',y')}\sin(\Phi-\phi)}{\sqrt{1-\left[\frac{r}{R(x',y')}\sin(\Phi-\phi)\right]^2}}\right\} \qquad (63)$$

Using equation (63) the distortion caused in the acquired images by an eccentered acoustic sensor may be corrected, where R(x', y') is the measured distance from the tool to the wellbore in tool coordinates. An alternate correction may be made by computing the radius from the tool to the wellbore using the elliptical model data. Depending on the circumstances, both methods or a combination of them have their uses: The first method, that is, the measured R(x', y') is generally preferred since it retains the true distance to the observation point. The latter method, that is, the alternate correction, may be preferred when data about a particular area is missing or incorrect.

Figure 5:
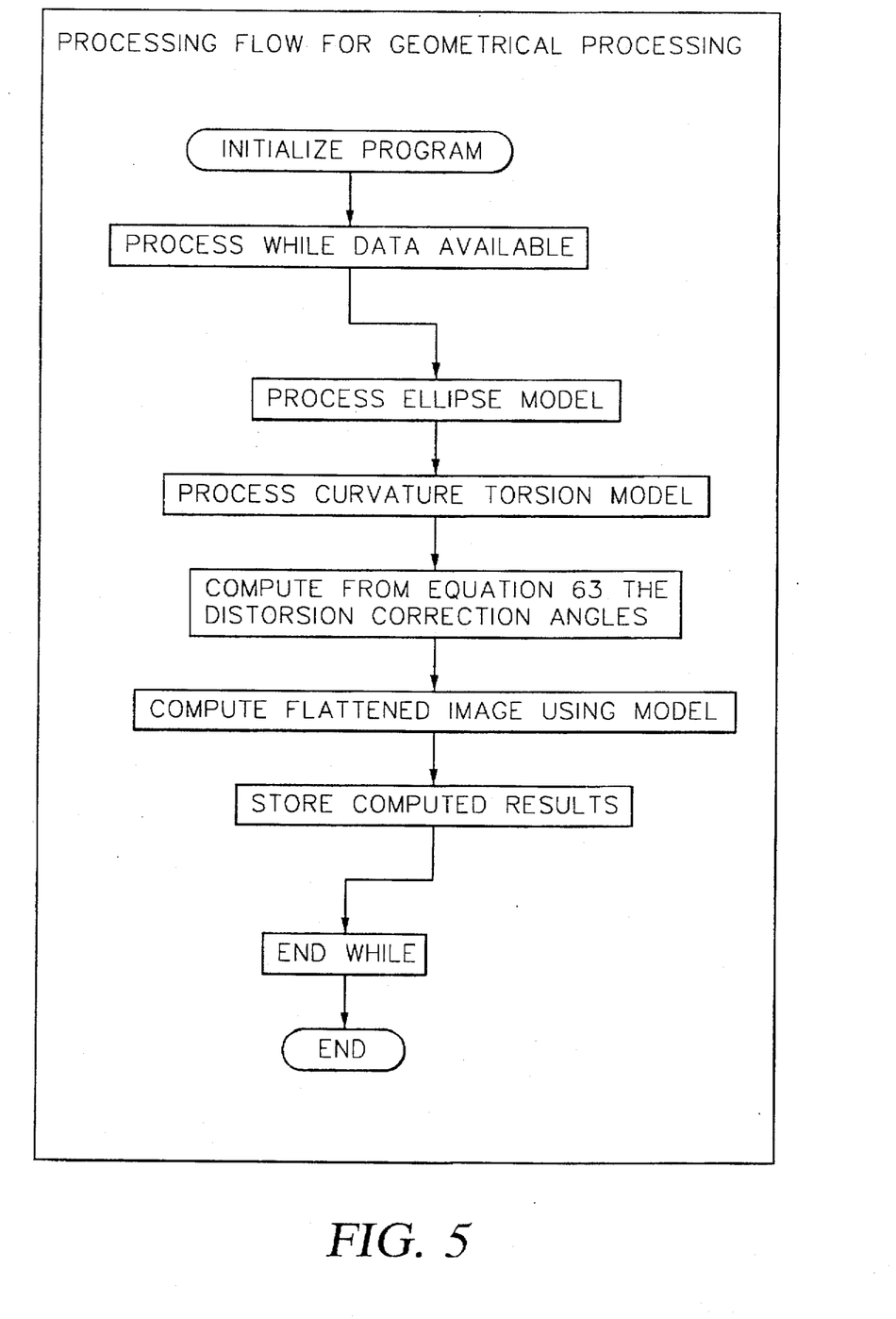
FIG. 5 is a flow chart showing the general processing flow for geometrical processing of acoustic logging data.
Figure 6:
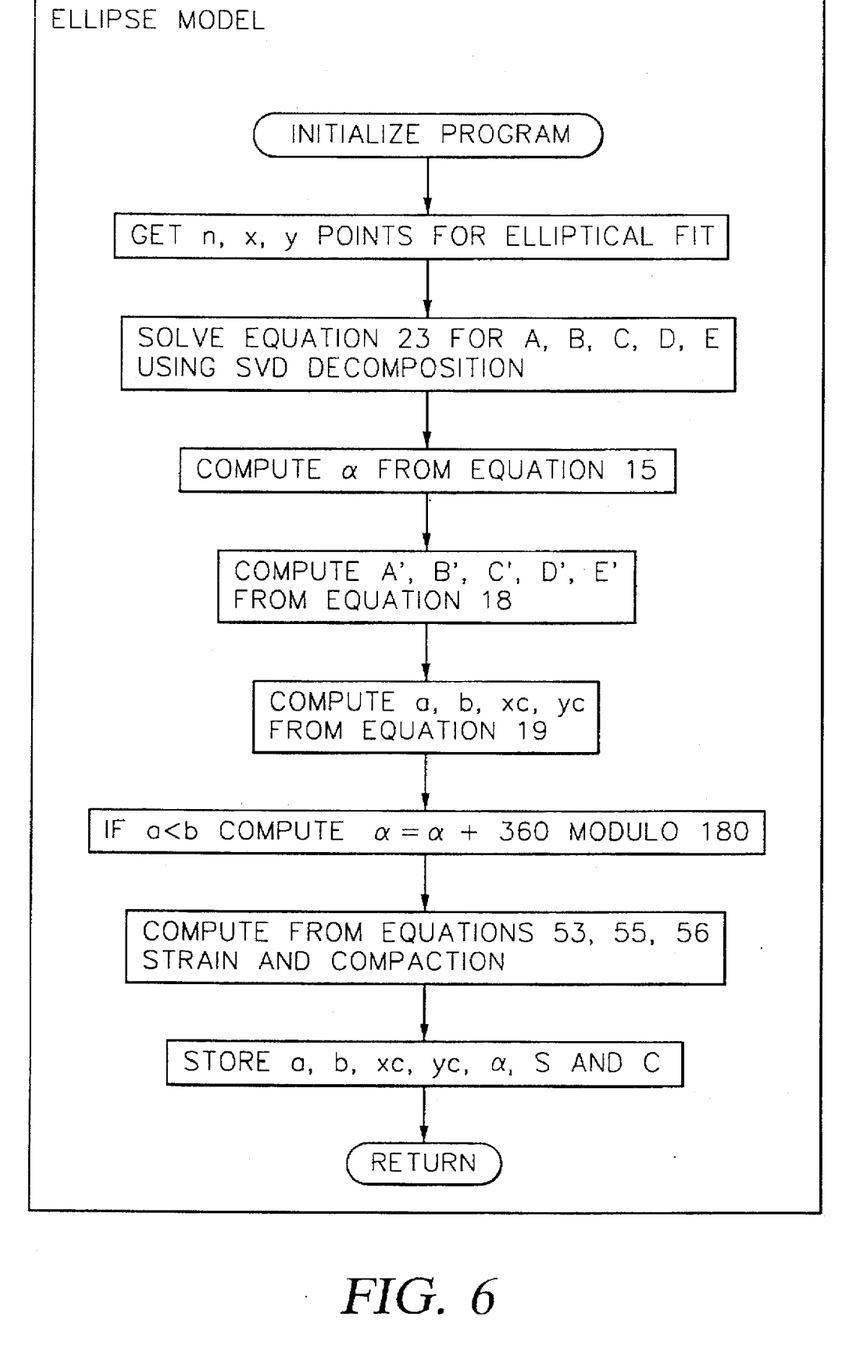
FIG. 6 is a flow chart showing the general processing flow for an ellipse model used in the geometrical processing of acoustic logging data of FIG. 5.
Figure 7:
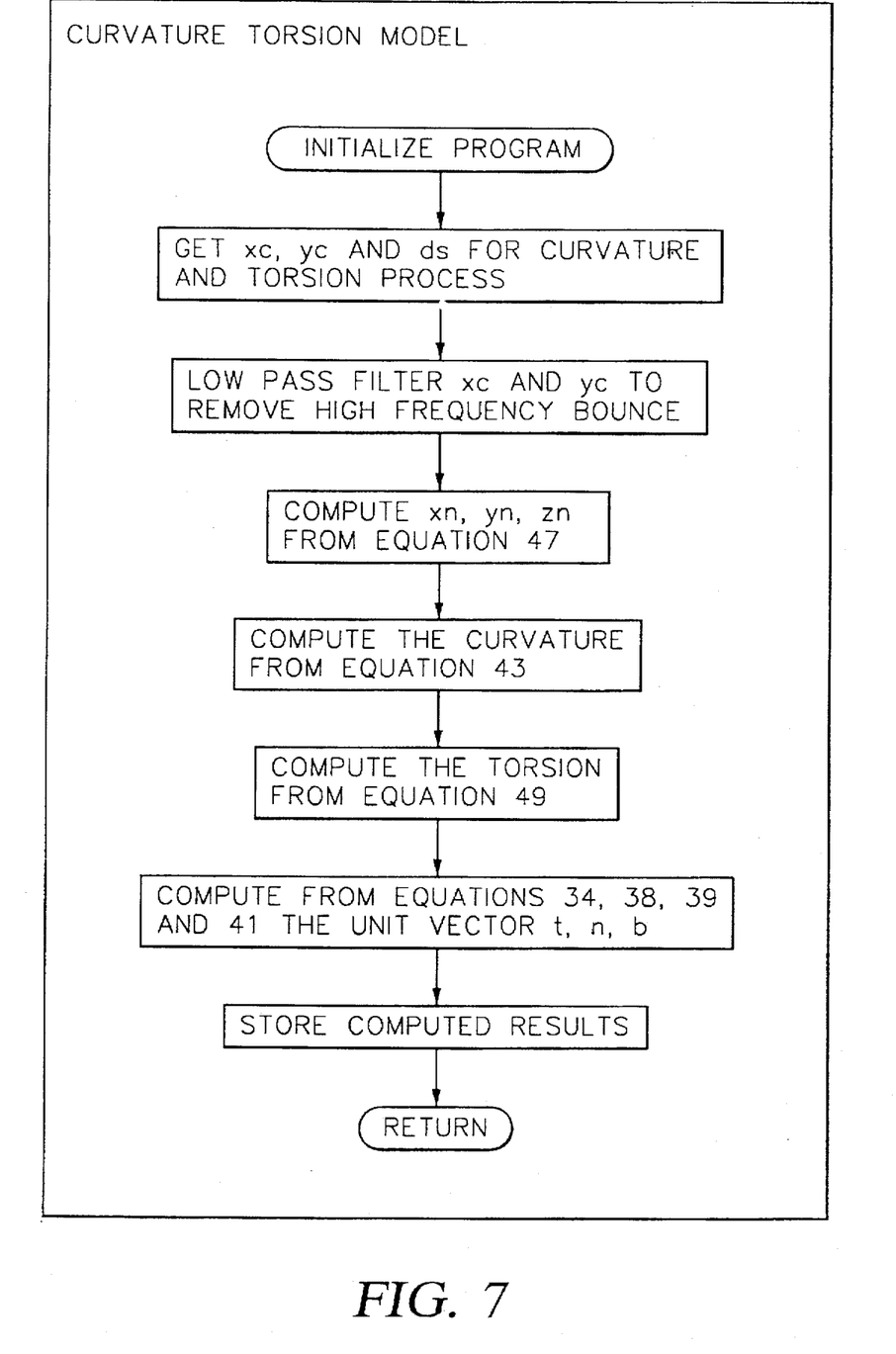
FIG. 7 is a flow chart showing the general processing flow for a curvature torsion model used in the geometrical processing of acoustic logging data of FIG. 5.

The calculations required for the method of this invention may be done by computer. Flow charts illustrating a computer program to perform these calculations are provided as FIGS. 5, 6, and 7. The calculations required for the method of this invention may also be done using mechanical caliper data or other radius data instead of ultrasonic pulse echo data.

DESCRIPTION OF AN ALTERNATIVE EMBODIMENT

The invention generally uses measurements of the distance between the instrument axis and the inner wall of the casing in order to determine the geometry of the casing at the measurement depth in the casing. In the first embodiment, these measurements could be provided by an acoustic pulse-echo wellbore imaging instrument. An alternative embodiment can provide the required measurements of distance between the instrument axis and the inner wall of the casing using an instrument known in the art as a multi-finger caliper. A typical multi-finger caliper which will provide the measurements required in this embodiment of the invention is described, for example, in a sales brochure entitled *Multifinger Imaging System*, Sondex Geophysical Equipment, Hampshire, England, U. K. (1995). The instrument described in the brochure includes a plurality of radially equally spaced apart sensor arms, or "fingers", each of which generates a measurement corresponding to the distance between the instrument axis and the wall of the wellbore at that particular finger.

As can be readily appreciated, the measurements of distance provided by the multifinger caliper are functionally equivalent to the distance measurements provided by the acoustic imaging instrument as described in the first embodiment of the invention. To use the measurements provided by the multifinger caliper, the "transducer position" described in equation (26) as ($\delta$, L1+L2) can be substituted by the axial position along the instrument instrument of the contact point of each finger with the inner wall of the casing. The rectilinear coordinates of each distance measurement made by the acoustic imaging instrument, as described for equation (22) as ($x_n$, $y_n$), can be directly substituted by the distance measurements made by each finger of the caliper instrument.

It will be apparent that various changes may be made in the details of the performance of the method of this invention without departing from the spirit and scope of the invention as defined in the appended claims. It is therefore to be understood that this invention is not to be limited to the specific details shown and described above.

I claim:

1. A method of logging a wellbore which comprises:

locating a logging tool including an acoustic transducer in the well;

transmitting a series of acoustic pulses radially centered from the transducer at different radial positions of the transducer at said location;

detecting the arrival times at the transducer of echoes of the pulses coming from the wall of the well to relate the position of the transducer to the wall of the well at said position; and generating a general quadratic model of the well at said position from said arrival times, wherein said general quadratic model is a circular model based on the equation:

$$(x+x_c)^2+(y+y_c)^2=r^2$$

where ($x_c$, $y_c$) represents the center coordinate for the circle, r represents the radius of the circle and x and y represent the coordiantes of points used to model the circle.

2. The method of claim 1 which further comprises centralizing the logging tool with the well at a position spaced from said location.

3. The method of claim 1 which further comprises:

centralizing the logging tool at two spaced locations along the well and at known distances from the transducer; and determining the curvature of the wall between the transducer and said two spaced locations.

4. A method for determining characteristics of a wellbore penetrating a subterranean formation, comprising:

caliper logging said wellbore with a multifinger caliper instrument, said instrument including a plurality of radially spaced apart fingers, each of said fingers generating a measurement corresponding to a distance between an axis of said instrument an an inner wall of said wellbore;

converting said measurements of distance into cartesian coordinates for an original image of saif wellbore;

using said converted measurements to solve a general quadratic equation based on a least squares fit to an ellipse model representing said wellbore;

obtaining from said solving said general quadratinc equation eccentering information about said wellbore; and using said eccentering information to construct a centralized radius image of said wellbore.

5. The method as defined in claim 4 further comprising correcting said centralized radius image for distortion caused by eccentering of said multifinger caliper instrument within said wellbore.

6. The method as defined in claim 4 further comprising:
using said ellipse model and eccentering imformation to generate a modelled image of said wellbore;
subtracting said modelled image from said centralized radius image;
adding to a result of said step of subtracting an estimate of an average radius of an ellipse corresponding to said ellipse model; and
producing a flattened image of said wellbore.

7. A method of logging a wellbore, comprising:
positioning a well logging instrument at a location in said wellbore, said well logging instrument including sensors capable of generating a measurement of a distance between an axis of said instrument and a wall of said wellbore at radially spaced apart positions around said well logging instrument;
generating a general quadratic model of said wellbore from said measurements distance at said location.

8. The method as defined in claim 7 wherein said quadratic model is an elliptical model based on the relationship:

$$\frac{(x+x_c)^2}{a} + \frac{(y+y_c)^2}{b} = 1$$

wherein a coodrinate $(x_c, y_c)$ represents the center of an ellipse according to said model, a and b correspond respectively to the semi-major and to the semi-minor axes of said ellipse, and x and y represent the coordinates of points along the periphery of said ellipse.

9. The method as defined in claim 7 wherein said model is a circular model based on the relationship:

$$(x+x_c)^2 + (y+y_c)^2 = r^2$$

wherein the coordinate $(x_c, y_c)$ represents the center of a circle, r represents the radius of said circle, and x and y represent the coordinate of points along the periphery of said circle.

10. The method as defined in claim 7 further comprising centralizing said well logging instrument within said wellbore at a position axially spaced apart from said location.

11. The method as defined in claim 7 further comprising:

centralizing said well logging instruement at two axially spaced apart positions, said axially spaced apart positions each having a known axial distance from said location; and determining a curvature of said wellbore between said location and said axially spaced apart positions.

* * * * *